Patented Dec. 30, 1952

2,623,867

UNITED STATES PATENT OFFICE 2,623,867

MANUFACTURE OF POLYUREA-URETHANES

Henry Dreyfus, deceased, late of London, England, by Claude Bonard, administrator, London, England, assignor to Celanese Corporation of America, a corporation of Delaware No Drawing. Original application October 25, 1947, Serial No. 782,213. Divided and this application September 14, 1949, Serial No. 115,766. In Great Britain January 23, 1939

2 Claims. (Cl. 260—77.5)

This invention relates to improvements in the manufacture of highly polymeric compounds and the production of artificial filaments, films and other products therefrom, and is a divisional of co-pending U. S. application S. No. 782,213 filed October 25th, 1947, which has issued as Pat. No. 2,568,885.

It has been found that highly polymeric compounds having valuable properties, particularly as base materials for the production of artificial filaments, foils and other shaped articles, may be produced by reaction between bifunctional molecules containing as reactive radicles urethane radicles on the one hand and on the other hand amino groups containing hydrogen atoms attached to nitrogen or hydroxyl groups or carboxylic groups. The urethane radicle utilized is the radicle —NH.CO.OR, where —OR is the residue of a volatile monohydroxy compound, i. e. a volatile alcohol or phenol. The said urethane radicle may be in the same reagent as the amino, hydroxyl or carboxylic radicle, in which case the polymer may be produced by reacting the compound with itself or with another compound containing appropriate reactive groups. It is preferred, however, to use a compound containing two urethane radicles and to react it with a bifunctional compound containing two groups each of which is either amino, hydroxyl or carboxyl.

As examples of compounds which may be reacted with the compounds containing the urethane radicles, the following may be instanced: Amino acids, for example $\omega$-amino-caproic acid, $\omega$-amino-caprylic acid and $\omega$-amino-nonanoic acid; dicarboxylic acids, for example glutaric acid, adipic acid, suberic acid, azelaic acid, sebacic acid, brassylic acid and hexahydroterephthalic acid; dihydroxy compounds, for example trimethylene glycol and tetramethylene glycol; diamines, for example trimethylene diamine, tetramethylene diamine and pentamethylene diamine; and amino alcohols, for example ethanolamine, the propanolamines and the butanolamines.

It is preferred to employ reagents containing a chain of methylene groups linked to the reactive radicles, e. g. a urethane radicle at both ends or a urethane radicle at one end and an amino group, a hydroxy group or a carboxy group at the other. Thus, for example, a polymethylene diurethane may be reacted with a polymethylene diamine, glycol or amino alcohol.

The urethane compounds may be produced by reacting the corresponding amino compounds with a carbonate, for example phenyl carbonate, or with a chloroformate, for example phenyl chloroformate; or by reacting the corresponding isocyanate or carbamyl chloride with a hydroxyl compound, for example a volatile phenol; or by reacting the appropriate azide with a hydroxy compound, for example a volatile phenol.

As previously indicated, the compounds used according to the present invention are bifunctional compounds, that is to say they contain two and only two reactive radicles. The reactive radicles should not be in such a position in the molecule that they can react to form cyclic compounds containing 4–7 atoms in the ring, since otherwise such cyclisation may take place in preference to intermolecular reaction leading to the production of a highly polymeric product. Thus, when radicles capable of reacting with each other are present in the same molecule, they are preferably separated by a chain of at least six atoms. Furthermore, for the production of high polymers having filament- or film-forming properties, the complementary reactive radicles should be present in the reaction mixture in substantially equivalent proportions.

The production of the polymers according to the present invention may be effected by heating the reactants at a suitable temperature, for example 100–200 or 250° C. or even more, until a product having filament- or film-forming properties is obtained. The reaction may be carried out in its early stages under atmospheric pressure, but, in order to complete the reaction, that is to say obtain a product having filament- or film-forming properties, it may be necessary, at least in the later stages, to reduce the pressure very considerably, for example to 5 mms. of mercury or even less. When the reaction involves the splitting off of a relatively volatile substance, as is the case in using urethane radicles as reactive radicles, it is desirable to remove the volatile by-product from the reaction medium as rapidly as possible. This may be assisted by passing an inert gas, for example nitrogen, through the reaction mixture. The reaction may be carried out in the presence of a suitable liquid which is a solvent for the reagents.

In order to obtain products having filament- or film-forming properties, it is in general necessary to continue the reaction until the polymer produced has a molecular weight of 8,000–10,000 or more. A rough test of whether the reaction is sufficiently far advanced may be made by dipping a glass rod into the reaction medium, or, if an inert diluent is present, into the molten mass obtained after evaporating off the diluent from a sample of the reaction medium, and withdrawing the rod. If the properties of the product are satisfactory, a filament will then be formed.

The high polymers of the present invention may be purified by washing them with suitable solvents or by dissolving them up and reprecipitating them, and they may then be employed for the manufacture of shaped articles.

For example, filaments, foils and similar articles may be produced by extruding a solution of the high polymer through a shaping device into a gaseous or liquid setting medium, or by extruding a plastic or molten mass of the polymer through a shaping device and taking it up on a roller or other forwarding device. The filaments or similar products may be stretched to increase their tenacity either continuously with their production or subsequently thereto, if necessary when in a softened condition under the influence of heat or a suitable solvent. A similar improvement in the properties of filaments and like products may be effected by subjecting them to a rolling operation, e. g. by passing them between rollers.

The following examples illustrate the invention, the proportions of reagents used being in parts by weight:

EXAMPLE 1

Polymer from an aminohydroxy compound and a di-urethane 306 parts of octamethylene diphenyl urethane (M. P. 118° C., obtained from the di-isocyanate by reaction with phenol) and 48.6 parts of ethanolamine were heated for 1½ hours in an atmosphere of nitrogen using a molten metal heating bath maintained at 180° C. The mixture rapidly formed a clear homogeneous melt with vigorous effervescence which gradually slackened as heating was continued. On cooling, the clear pale yellow melt set to a white pasty solid. Heating was continued for a further hour while raising the temperature to 200° C. The liberated phenol was then distilled off under an absolute pressure of 3 mms. of mercury, leaving the solid polymer. The temperature was then raised to 240° C. during ½ hour and this temperature was maintained for a further 1½ hours. The polymer was freed from phenol by dissolving in hot formic acid and reprecipitating in aqueous acetone. The final polymer melted sharply at 174–176° C.

EXAMPLE 2

Polymer from diamines and di-urethanes 328 parts of tetramethylene diphenyl urethane (obtained from the di-isocyanate and phenol) and 144 parts of octamethylene diamine were heated to 180° C. in an atmosphere of nitrogen using a molten metal heating bath and maintained at this temperature for 3 hours. The phenol was then distilled off under an absolute pressure of 4 mm. of mercury and the temperature raised to 240° C. during ½ hour and the melt maintained at this temperature for a further two hours. The product was cooled and purified from phenol as described in Example 1. The product was a faintly yellow hard solid, melting at about 215° C., and readily yielded filaments from a melt.

The polymer formed from equal moles of pentamethylene diamine and pentamethylene diphenyl urethane (M. P. 113–4° from pentamethylene di-isocyanate and phenol) melted at 208–210° C. and gave filaments from the melt with cold drawing properties.

EXAMPLE 3

Polymers from dicarboxylic acids and di-urethanes 328 parts of tetramethylene diphenyl urethane and 202 parts of sebacic acid were melted together and heated to 180° C. for 3 hours. During the heating evolution of carbon dioxide occurred and the mass frothed. The phenol was distilled off under an absolute pressure of 3 mm. and the temperature raised to 240° C. while still under the vacuum and the temperature maintained until the total heating time was 5½ hours. The product, already substantially free from phenol, was dissolved in hot formic acid and the solution poured into acetone. The product had a melting point of 236–238° C. and gave filaments having a cold draw of several hundred per cent.

The polymer formed in a similar way from tetramethylene diphenyl urethane and adipic acid melted at 276–278° C. That from octamethylene diphenyl urethane and adipic acid melted at 235–236° C. and from octamethylene diphenyl urethane and sebacic acid at 196–197° C.

EXAMPLE 4

Polymer from dihydroxy compounds and di-urethanes 356 parts of hexamethylene diphenyl urethane (M. P. 138° C. from hexamethylene diamine and phenyl chloroformate) and 118 parts of hexamethylene glycol were heated under nitrogen to 180° C. for 3 hours, the phenol distilled off in vacuo as in the preceding examples, and the product further heated for 2 hours at a temperature of 225–230° C. The product was dissolved in hot formic acid and reprecipitated with acetone. The product melted at 149–150° C. and on cooling was a tough horny mass from which filaments could readily be drawn which exhibited a considerable amount of cold draw.

The polymer from the same di-urethane and tetramethylene glycol melted at 176–177° C. That from octamethylene diphenyl urethane and tetramethylene glycol melted at 155–157° C.

EXAMPLE 5

Polymer from hexamethylene glycol and asymmetrical m-toluylene diphenyl urethane 362 parts of asymmetrical m-toluylene diphenyl urethane (1 $CH_3$; $NHCOOC_6H_5$ 2.4, M. P. 147° C., made from the corresponding di-isocyanate and phenol) and 118 parts of hexamethylene glycol were heated together and the polymer finally purified according to the schedule of Example 4. The final polymer was more glassy than that of Example 4 and softened over a considerable range beginning at about 130° C. and being finally completely liquid at about 200–210° C.

In the above examples, the corresponding dimethyl or diethyl urethanes may be substituted for the diphenyl urethanes and yield products having similar properties. The heating time, however, has to be extended due to their lower reactivity.

Having described the invention, what is desired to secure by Letters Patent is:

1. Process for the production of polymers, which comprises reacting a diurethane having the formula $C_6H_5O.OC.NH-R'-NH.CO.OC_6H_5$ in which R' is a polymethylene radicle, with a substantially equimolecular proportion of monoethanolamine, and continuing the reaction until a filament-forming polymer is produced.

2. Process for the production of polymers, which comprises reacting a diurethane having the formula $C_6H_5O.OC.NH-R'-NH.CO.OC_6H_5$ in which R' is a polymethylene radicle, with a substantially equimolecular proportion of monoethanolamine at a temperature between 100 and 250° C. while permitting escape of the volatile monohydroxy compound, and continuing the reaction until a filament-forming polymer is produced.

CLAUDE BONARD,
*Administrator of the Estate of Henry Dreyfus, Deceased.*

REFERENCES CITED

The following references are of record in the file of this patent:

UNITED STATES PATENTS

| Number | Name | Date |
| --- | --- | --- |
| 2,343,808 | Schlack | Mar. 7, 1944 |

FOREIGN PATENTS

| Number | Country | Date |
| --- | --- | --- |
| 888,700 | France | Sept. 13, 1943 |